US012774634B2

(12) United States Patent
Huang et al.

(10) Patent No.: US 12,774,634 B2
(45) Date of Patent: Oct. 27, 2026

(54) WINDOW SHADE AND PANEL ASSEMBLY THEREOF

(71) Applicant: Teh Yor Co., Ltd., New Taipei City (TW)

(72) Inventors: Chin-Tien Huang, New Taipei City (TW); Chien-Fong Huang, City of Industry, CA (US)

(73) Assignee: Teh Yor Co., Ltd., New Taipei City (TW)

( * ) Notice: Subject to any disclaimer, the term of this patent is extended or adjusted under 35 U.S.C. 154(b) by 153 days.

(21) Appl. No.: 18/883,955

(22) Filed: Sep. 12, 2024

(65) Prior Publication Data

US 2025/0003287 A1 Jan. 2, 2025

Related U.S. Application Data

(63) Continuation of application No. 17/507,971, filed on Oct. 22, 2021, now Pat. No. 12,116,838.

(60) Provisional application No. 63/105,493, filed on Oct. 26, 2020.

(51) Int. Cl.
*E06B 9/262* (2006.01)

(52) U.S. Cl.
CPC ...... *E06B 9/262* (2013.01); *E06B 2009/2627* (2013.01)

(58) Field of Classification Search
CPC .... E06B 9/262; E06B 9/34; E06B 2009/2622; E06B 2009/2625; E06B 2009/2627
See application file for complete search history.

(56) References Cited

U.S. PATENT DOCUMENTS 4,673,600 A * 6/1987 Anderson ............... E06B 9/262 428/116
4,884,612 A * 12/1989 Schnebly ............... E06B 9/262 160/121.1
4,928,369 A * 5/1990 Schnebly ............... E06B 9/262 29/24.5
5,158,632 A * 10/1992 Colson .................... E06B 9/262 428/116
5,503,210 A * 4/1996 Colson .................. B29C 66/729 160/84.01
5,603,368 A * 2/1997 Colson .................. B29C 66/437 428/116
6,103,336 A * 8/2000 Swiszcz ............... B31D 3/0207 428/116

(Continued)

*Primary Examiner* — Johnnie A. Shablack
(74) *Attorney, Agent, or Firm* — Chen Yoshimura LLP

(57) ABSTRACT

A panel assembly for a window shade includes two elongate strips made of a single material layer that are bonded to a support sheet having a multilayer structure. Each elongate strip has a first and a second edge, and a main strip portion between a first and a second margin, the first and second margin respectively adjoining the main strip portion along a first and a second folding line, the first margin extending between the first folding line and the first edge, the second margin extending between the second folding line and the second edge and including a third folding line. The first margin of each elongate strip is bonded to the support sheet, and the second margin of a first elongate strip is bonded to a second elongate strip at a first margin portion between the third folding line and the second edge of the first elongate strip.

20 Claims, 18 Drawing Sheets

(56) References Cited

U.S. PATENT DOCUMENTS 6,354,353 B1 * 3/2002 Green ........................ E06B 9/26
160/84.04
6,416,842 B1 * 7/2002 Swiszcz .................. E06B 9/262
428/116
7,191,816 B2 * 3/2007 Colson .................... E06B 9/264
160/84.05
8,171,640 B2 * 5/2012 Colson .................. B29C 66/437
29/897
8,496,768 B2 * 7/2013 Holt .......................... E06B 9/34
160/133
D691,397 S * 10/2013 Colson ........................... D6/580
D692,684 S * 11/2013 Colson ........................... D6/580
9,249,618 B2 * 2/2016 Sevcik .................... E06B 9/262
9,458,663 B2 * 10/2016 Colson .................... E06B 9/264
9,540,874 B2 * 1/2017 Colson ...................... E06B 9/40
9,988,836 B2 * 6/2018 Judkins ................... E06B 9/262
10,648,229 B2 * 5/2020 Colson .................... E06B 9/264
10,655,388 B2 * 5/2020 Smith ..................... E06B 9/322
10,975,616 B2 * 4/2021 Colson .................. B29C 66/729
11,186,070 B2 * 11/2021 Swiszcz ................ B32B 27/302
11,242,711 B2 * 2/2022 Lynch ..................... B32B 27/36
11,332,974 B2 * 5/2022 Chiquin .................... E06B 9/42
2005/0150608 A1 * 7/2005 Auger ....................... E06B 9/40
160/84.05
2006/0157205 A1 * 7/2006 Auger ..................... E06B 9/262
160/84.05
2007/0074826 A1 * 4/2007 Jelic .......................... E06B 9/38
160/84.05
2008/0066277 A1 * 3/2008 Colson .................... B29C 53/36
29/24.5
2008/0264572 A1 * 10/2008 Forst Randle ............ E06B 9/40
160/84.05
2011/0049071 A1 * 3/2011 Hart .......................... E06B 9/42
211/124
2014/0034251 A1 * 2/2014 Colson .................... E06B 9/264
160/133
2014/0053989 A1 * 2/2014 Colson ................... A47H 23/04
160/264
2018/0002978 A1 * 1/2018 Colson ................... B65H 18/28
2018/0106101 A1 * 4/2018 Holt .......................... E06B 9/42
2018/0119487 A1 * 5/2018 Colson .................... E06B 9/384
2019/0316413 A1 * 10/2019 Huang .................... E06B 9/386
2020/0232272 A1 * 7/2020 Colson .................... E06B 9/266
2022/0127903 A1 * 4/2022 Huang .................... E06B 9/262

* cited by examiner

100

WINDOW SHADE AND PANEL ASSEMBLY THEREOF

CROSS-REFERENCE TO RELATED APPLICATION(S)

This application is a continuation application of U.S. patent application Ser. No. 17/507,971 filed on Oct. 22, 2021, which claims priority to U.S. provisional patent application No. 63/105,493 filed on Oct. 26, 2020, the disclosure of which is hereby incorporated by reference.

BACKGROUND

1. Field of the Invention

The present invention relates to window shades, and panel assemblies for window shades.

2. Description of the Related Art

Some conventional window shades may use a panel comprised of multiple cells for covering a window opening. For example, some approaches propose that a plurality of transversal strips are attached to one another in overlapping relation to form the cells, each transversal strip being arranged to alternately form a front and a rear of adjacent cells. These approaches have a complex construction, and are not cost-effective to manufacture. Moreover, the cells may not collapse and expand as desired during use, which may affect the outer appearance of the panel and the ability of the cells to provide thermal insulation.

Therefore, there is a need for an improved window shade that is more easy to manufacture, and can address the foregoing issues.

SUMMARY

The present application describes a window shade and a panel assembly that is relatively simple in construction and can address the aforementioned issues.

According to one aspect, a panel assembly for a window shade includes a support sheet having a multilayer structure, and a plurality of elongate strips bonded to the support sheet, the support sheet and the elongate strips forming a plurality of cells, the elongate strips including at least a first and a second elongate strip adjacent to each other, each of the first and second elongate strip being made of a single layer of material. Each of the first and second elongate strip has a first and a second edge opposite to each other, and a main strip portion located between a first and a second margin, the first margin adjoining the main strip portion along a first folding line and extending between the first folding line and the first edge, the second margin adjoining the main strip portion along a second folding line and extending between the second folding line and the second edge, the second margin including a third folding line substantially parallel to the second folding line. The first margin of each of the first and second elongate strip is bonded to the support sheet, and the second margin of the first elongate strip is bonded to the second elongate strip at a first margin portion between the third folding line and the second edge of the first elongate strip and unbonded to the second elongate strip at a second margin portion between the second folding line and the third folding line of the first elongate strip.

Moreover, the present application provides a window shade that incorporates the panel assembly.

DETAILED DESCRIPTION OF THE EMBODIMENTS

Figure 1:
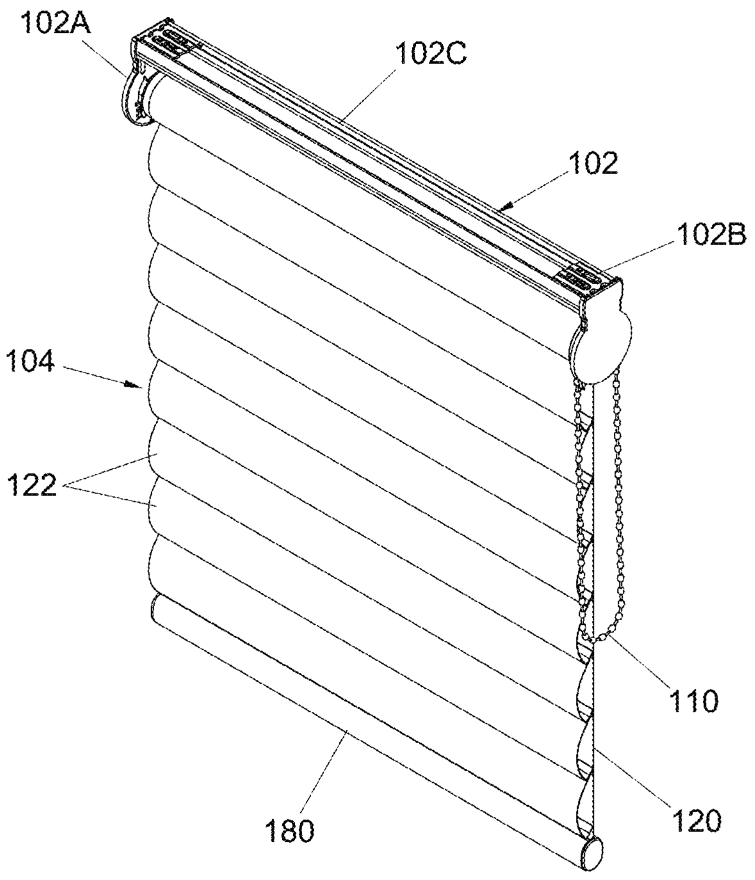
FIG. 1 is a perspective view illustrating an embodiment of a window shade.
Figure 2:
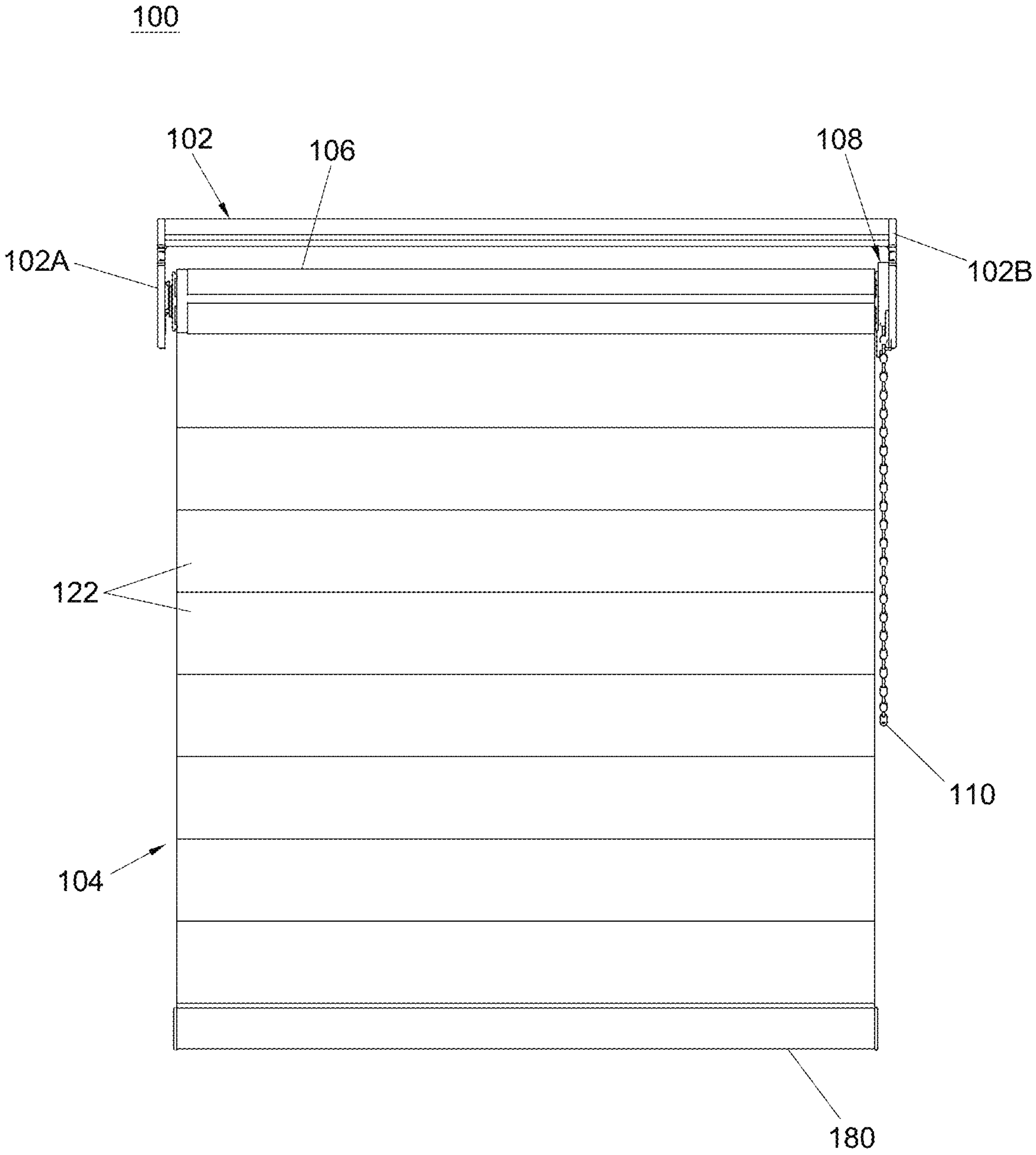
FIG. 2 is a front view illustrating the window shade of FIG. 1.
Figure 3:
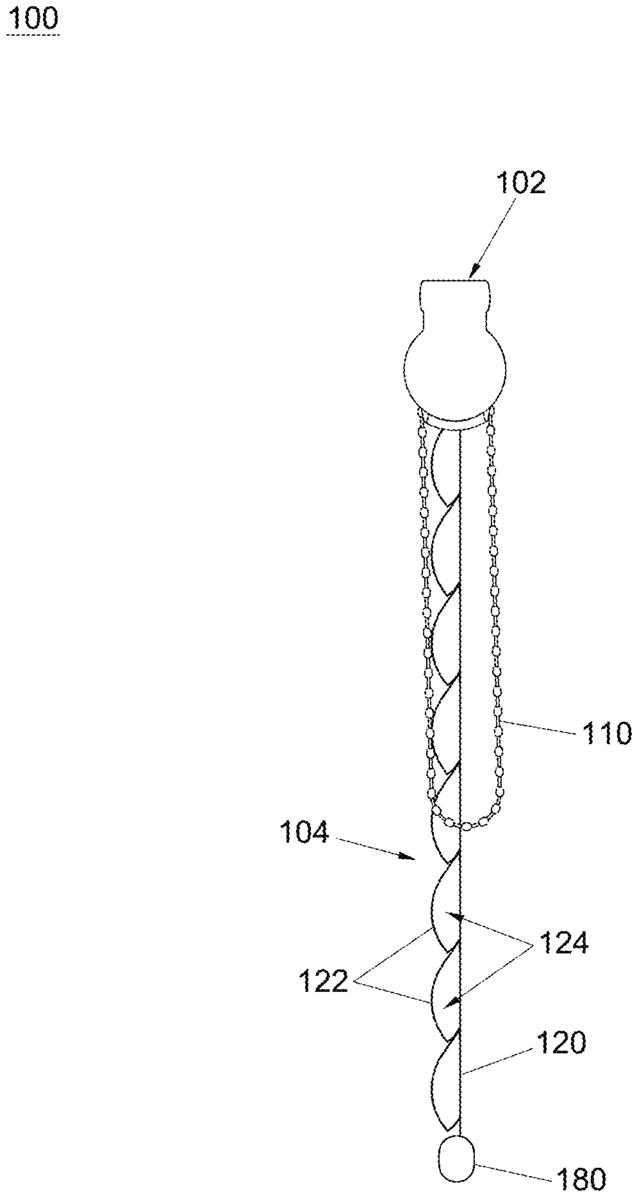
FIG. 3 is a side view illustrating the window shade of FIG. 1.
Figure 4:
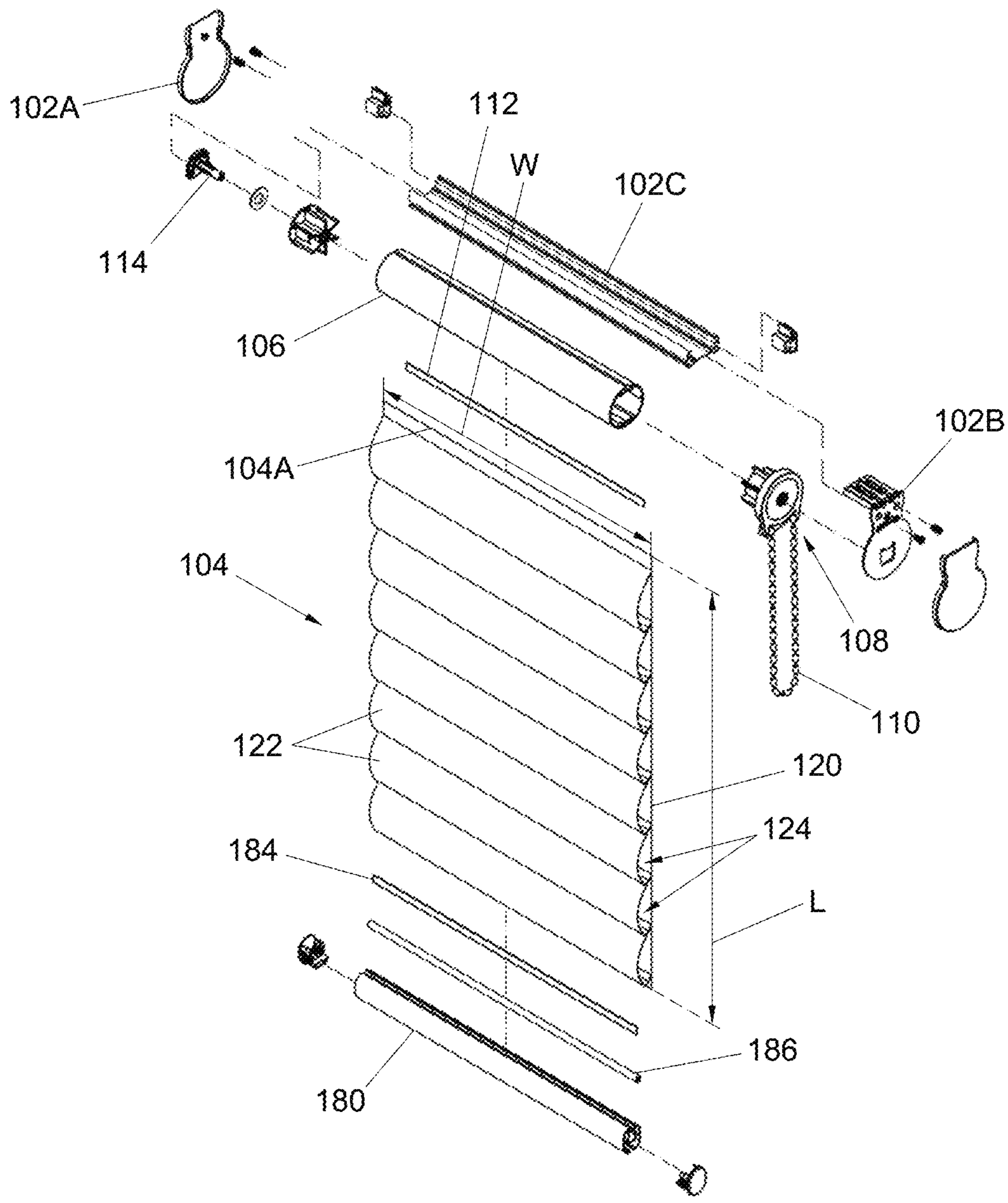
FIG. 4 is an exploded view of the window shade shown in FIG. 1.

FIG. 1 is a perspective view illustrating an embodiment of a window shade 100, FIGS. 2 and 3 are respectively a front and a side view of the window shade 100, and FIG. 4 is an exploded view illustrating some construction details of the window shade 100. Referring to FIGS. 1-4, the window shade 100 can include a head frame 102, a panel assembly 104, and an actuating system assembled with the head frame 102 for controlling the movement of the panel assembly 104.

The actuating system may include a roller 106, and a control device 108 having an operating member 110. The roller 106 is connected with an end 104A of the panel assembly 104, and is pivotally connected with the head frame 102. According to an example of construction, the roller 106 may be connected with the panel assembly 104 by inserting an anchor strip 112 coupled to the end 104A of the panel assembly 104 inside a slot in the roller 106. The head frame 102 can include two side brackets 102A and 102B attached to an elongate rail 102C, and the roller 106 can have one end pivotally connected about a fixed shaft 114 that is fixedly connected with the side bracket 102A. The control device 108 is coupled to the other end of the roller 106, and is mounted to the side bracket 102B with the operating member 110 extending outside the head frame 102. Examples of the operating member 110 can include, without limitation, closed-loop elements such as bead chains. With this construction, the roller 106 is rotatable to wind and unwind the panel assembly 104, and the operating member 110 is operable to drive the roller 106 in rotation in either direction.

Referring to FIGS. 1-4, the panel assembly 104 includes a support sheet 120, and a plurality of elongate strips 122 bonded to the support sheet 120. The support sheet 120 has a length L along a first direction, and a width W along a second direction orthogonal to the first direction. The elongate strips 122 are bonded to the support sheet 120 adjacent to one another along the length L, and are substantially equal to the width W of the support sheet 120 in length. The support sheet 120 and the elongate strips 122 can form a plurality of cells 124 distributed adjacent to one another along the length L, each cell 124 having a hollow interior. The elongate strips 122 can be pressed against the support sheet 120 to collapse the cells 124, and can deflect away from the support sheet 120 to expand the cells 124. When the panel assembly 104 is deployed, the cells 124 can expand and provide thermal insulation.

Figure 5:
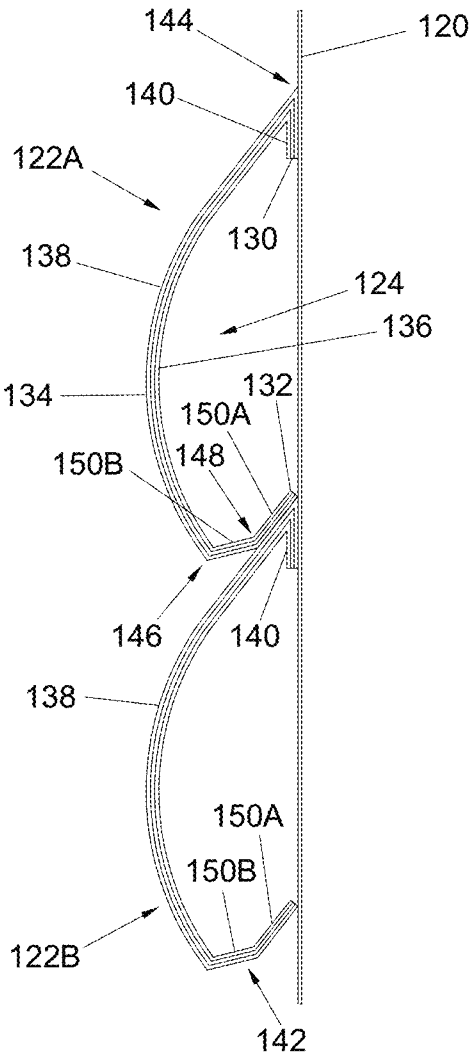
FIG. 5 is a side view illustrating the connection of two adjacent elongate strips for forming a panel assembly of the window shade.
Figure 6:
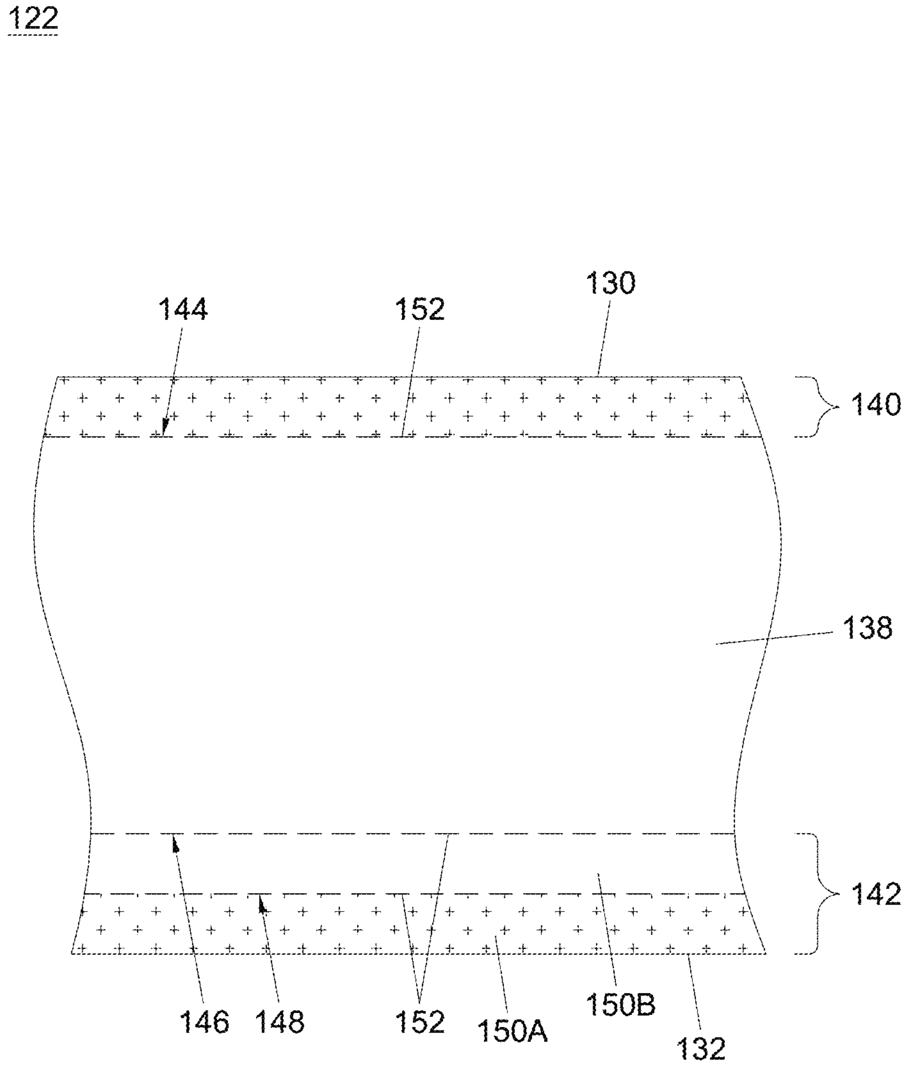
FIG. 6 is a schematic planar view illustrating a portion of one elongate strip.

The elongate strips 122 are similar in construction, and are attached along the length L of the support sheet 120 in a similar way for forming the panel assembly 104. The connection of the elongate strips 122 can be better understood in light of FIGS. 5 and 6, wherein FIG. 5 is a side view illustrating the connection of two adjacent ones of the elongate strips 122 (designated as adjacent elongate strips 122A and 122B), and FIG. 6 is a schematic planar view illustrating a portion of one of the elongate strips 122. Referring to FIGS. 1-6, each of the elongate strips 122 has two edges 130 and 132 opposite to each other, two opposite strip surfaces 134 and 136, and a main strip portion 138 located between two margins 140 and 142. The margin 140 adjoins the main strip portion 138 along a folding line 144 and extends between the folding line 144 and the edge 130. The margin 142 adjoins the main strip portion 138 along another folding line 146 and extends between the folding line 146 and the edge 132. The folding lines 144 and 146 are substantially parallel to each other and extend along the lengthwise direction of the elongate strip 122 (i.e., corresponding to the width W of the support sheet 120). Moreover, the margin 142 includes a folding line 148 that is substantially parallel to the folding line 146 and is located between the folding line 146 and the edge 132. The margin 142 thereby has a margin portion 150A extending between the edge 132 and the folding line 148, and a margin portion 150B extending between the two folding lines 146 and 148. In each of the elongate strips 122, each of the two strip surfaces 134 and 136 extends from the edge 130 to the edge 132 and stretches across the main strip portion 138 and the two margins 140 and 142.

Figure 7:
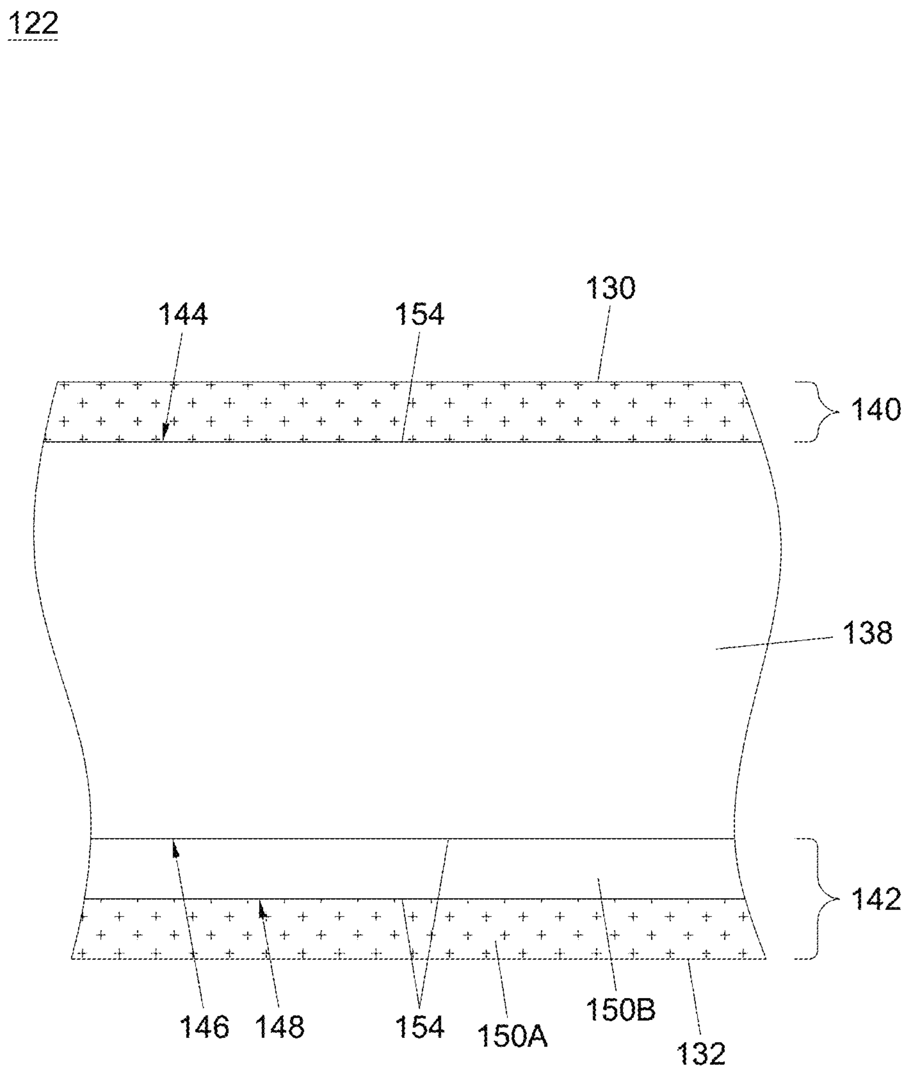
FIG. 7 is a schematic planar view illustrating a portion of one elongate strip having folding lines formed by creases.

Various methods may be applied to form the folding lines 144, 146 and 148 in each elongate strip 122. In the example illustrated in FIG. 6, each of the folding lines 144, 146 and 148 is formed by a perforation line 152. The perforation line 152 includes a plurality of perforations spaced apart from one another that are pierced through one or both of the two strip surfaces 134 and 136. FIG. 7 is a schematic view illustrating another example where each of the folding lines 144, 146 and 148 can be formed by a crease 154. The crease 154 is formed, e.g., with a rolling blade that is pressed against the strip surface 134 and/or the strip surface 136. The method applied for forming the folding lines 144, 146 and 148 may be selected according to the thickness of the elongate strip 122 and/or the materials of the elongate strip 122. The folding lines 144, 146 and 148 provided in each of the elongate strips 122 can facilitate the collapse and expansion of the cells 124 during use.

For forming the panel assembly 104, the margin 140 of the elongate strip 122B is bonded to the support sheet 120, and the margin 140 of the elongate strip 122A is bonded to the support sheet 120 at a distance from the margin 140 of the elongate strip 122B along the length L of the support sheet 120. The other margin 142 of the elongate strip 122A is bonded to the support sheet 120 or the elongate strip 122B at the margin portion 150A and is unbonded to the support sheet 120 and the elongate strip 122B at the margin portion 150B. Likewise, the margin 142 of the elongate strip 122B can be bonded to the support sheet 120 or another adjacent elongate strip (not shown) at the margin portion 150A and is unbonded to the support sheet 120 and the other adjacent elongate strip at the margin portion 150B. Examples of techniques applied for bonding the elongate strips 122 (including elongate strips 122A and 122B) include, without limitation, adhesive bonding, ultrasonic bonding, and the like.

In the example of FIG. 5, the margin 140 of the elongate strip 122A can be bonded on the strip surface 134 to the support sheet 120, and the margin portion 150A of the elongate strip 122A can be bonded on the same strip surface 134 to the elongate strip 122B. For example, the margin 140 of the elongate strip 122A can have a first adhesive layer applied on the strip surface 134 thereof, and the margin portion 150A of the elongate strip 122A can have a second adhesive layer applied on the strip surface 134 thereof. The elongate strip 122A then can be disposed so that the margin 140 of the elongate strip 122A is bonded to the support sheet 120 with the first adhesive layer, and the margin portion 150A of the elongate strip 122A is bonded to the strip surface 134 on the main strip portion 138 of the elongate strip 122B with the second adhesive layer at a location adjacent to the folding line 144 of the elongate strip 122B. Each of the elongate strips 122 can be sequentially bonded like described previously to form the panel assembly 104, wherein the support sheet 120 and the elongate strips 122 attached thereto can form multiple cells 124 adjacent to one another along the length L of the support sheet 120. In each elongate strip 122, the folding lines 144, 146 and 148 can facilitate movements of the main strip portion 138 toward and away from the support sheet 120 for collapsing and expanding the cell 124.

Figure 8:
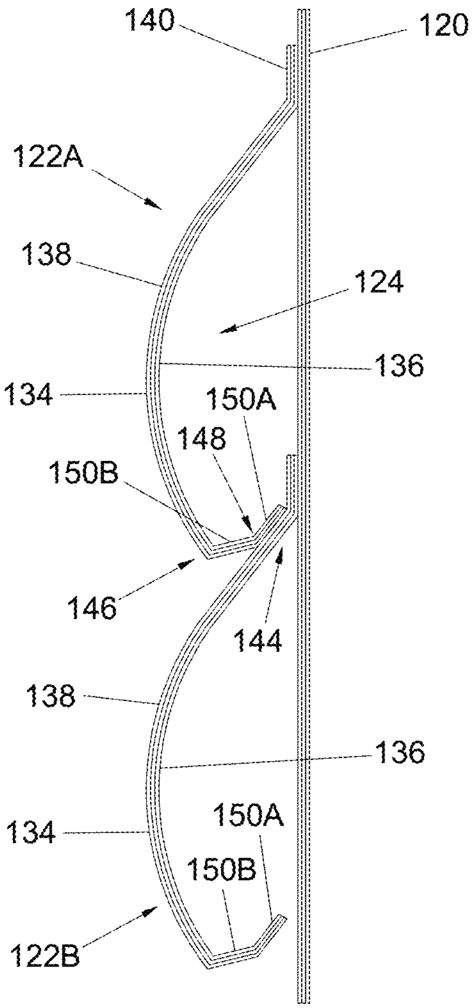
FIG. 8 is a side view illustrating a variant method of bonding elongate strips for forming the panel assembly.
Figure 9:
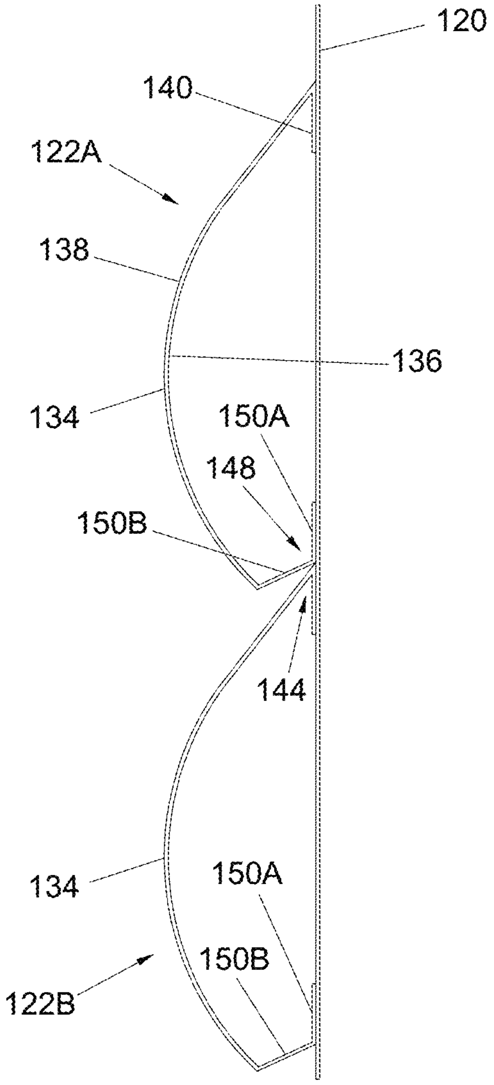
FIG. 9 is a side view illustrating another variant method of bonding elongate strips for forming the panel assembly.

Aside the bonding method of FIG. 5, other variant examples may be applied for bonding the elongate strips 122 as shown in FIGS. 8 and 9.

In the example of FIG. 8, the margin 140 of the elongate strip 122A can be bonded on the strip surface 136 to the support sheet 120, and the margin portion 150A of the elongate strip 122A can be bonded on the strip surface 134 to the elongate strip 122B. For example, the margin 140 of the elongate strip 122A can have a first adhesive layer applied on the strip surface 136 thereof, and the margin portion 150A of the elongate strip 122A can have a second adhesive layer applied on the strip surface 134 thereof. The elongate strip 122A can be disposed so that the margin 140 of the elongate strip 122A is bonded to the support sheet 120 with the first adhesive layer, and the margin portion 150A of the elongate strip 122A is bonded to the strip surface 134 on the main strip portion 138 of the elongate strip 122B with the second adhesive layer at a location adjacent to the folding line 144 of the elongate strip 122B. Each of the elongate strips 122 can be sequentially bonded like described previously to form the panel assembly 104.

In the example of FIG. 9, the margin 140 of the elongate strip 122A can be bonded on the strip surface 134 to the support sheet 120, and the margin portion 150A of the elongate strip 122A can be bonded on the same strip surface 134 to the support sheet 120. For example, the margin 140 of the elongate strip 122A can have a first adhesive layer applied on the strip surface 134 thereof, and the margin portion 150A of the elongate strip 122A can have a second adhesive layer applied on the same strip surface 134. The elongate strip 122A can be disposed so that the margin 140 of the elongate strip 122A is bonded to the support sheet 120 with the first adhesive layer, and the margin portion 150A of the elongate strip 122A is bonded to the support sheet 120 with the second adhesive layer at a location adjacent to the folding line 144 of the elongate strip 122B. Each of the elongate strips 122 can be sequentially bonded like described previously to form the panel assembly 104.

According to another example, the margin 140 of the elongate strip 122A can be bonded on the strip surface 136 to the support sheet 120 as shown in FIG. 8, and the margin portion 150A of the elongate strip 122A can be bonded on the strip surface 134 to the support sheet 120 and/or the margin 140 of the elongate strip 122B adjacent to the folding line 144 of the elongate strip 122B, wherein the margin 140 of the elongate strip 122B is bonded to the support sheet 120 like the margin 140 of the elongate strip 122A. For example, the margin 140 of the elongate strip 122A can have a first adhesive layer applied on the strip surface 136 thereof, and the margin portion 150A of the elongate strip 122A can have a second adhesive layer applied on the strip surface 134 thereof. The elongate strip 122A then can be disposed so that the margin 140 of the elongate strip 122A is bonded to the support sheet 120 with the first adhesive layer, and the margin portion 150A of the elongate strip 122A is bonded to the support sheet 120 and/or the margin 140 of the elongate strip 122B with the second adhesive layer at a location adjacent to the folding line 144 of the elongate strip 122B. Each of the elongate strips 122 can be sequentially bonded like described previously to form the panel assembly 104.

Referring to FIGS. 1-9, the support sheet 120 may have a single layer or a multilayer structure, which may be selected according to a desirable shading effect. For example, the support sheet 120 may have a single layer, two layers, three layers, or more. The materials used for making the support sheet 120 may be selected in accordance with desired properties for the support sheet 120, such as a desired light transmittance, outer appearance, mechanical properties, etc. Examples of suitable materials for the support sheet 120 can include, without limitation, opaque materials, semi-transparent materials such as woven or non-woven fabrics, and mesh fabrics.

Figure 10:
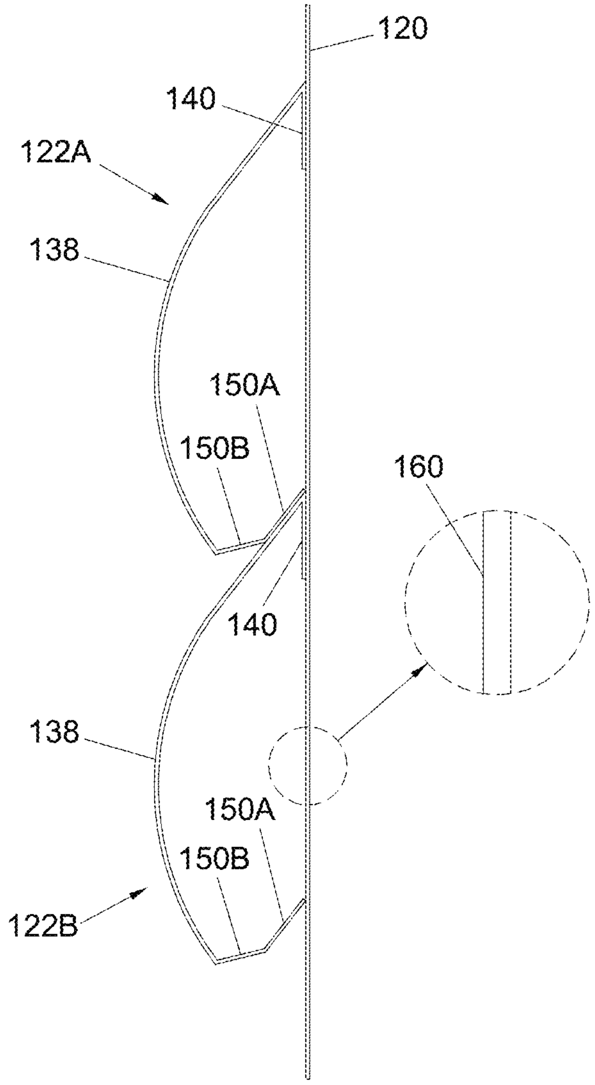
FIGS. 10-12 are schematic views illustrating various layer structures of a support sheet used in the panel assembly.

FIG. 10 is a schematic view illustrating an example in which the support sheet 120 has a single layer 160, which may be exemplarily a non-woven fabric. The single layer structure of FIG. 10 may be exemplarily adapted to make a support sheet 120 that is semi-transparent.

Figure 11:
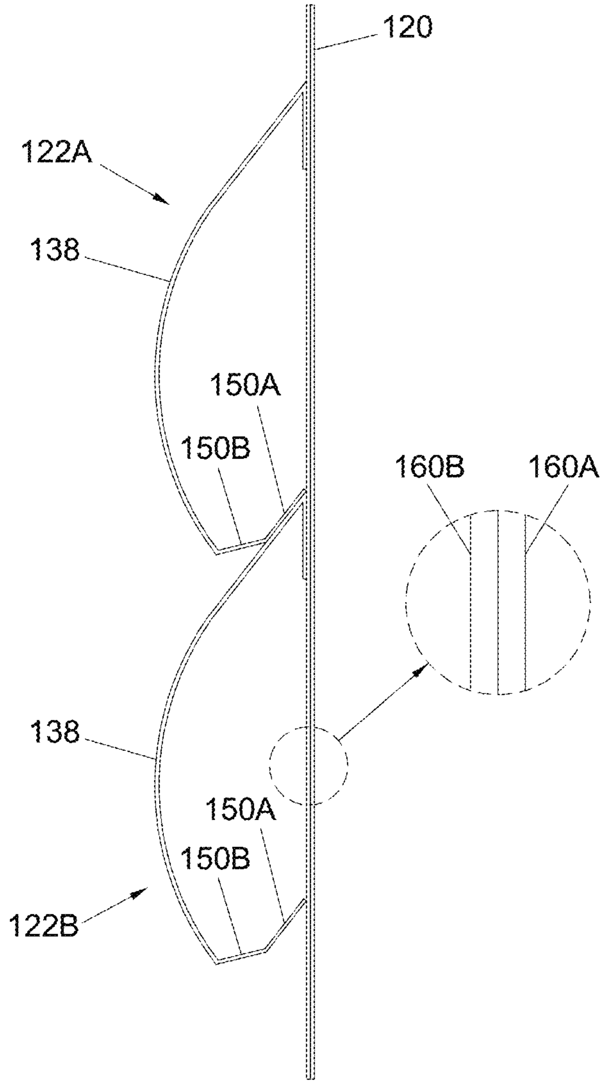
Figure 12:
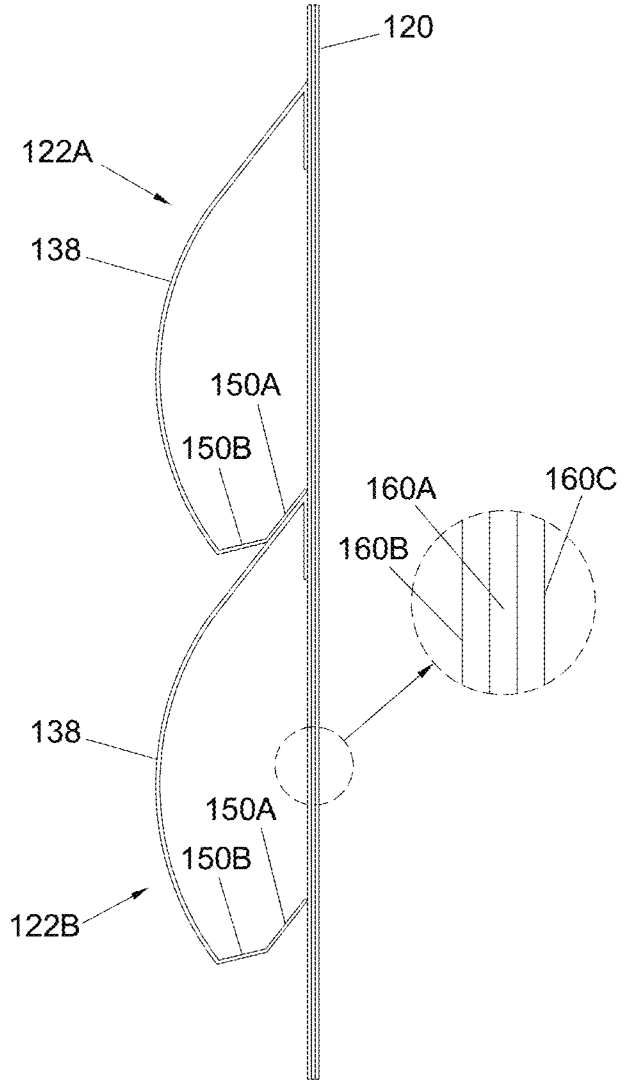

FIG. 11 is schematic view illustrating an example in which the support sheet 120 has two material layers 160A and 160B bonded to each other, wherein the material layer 160A can be made of an opaque polyester material (e.g., polyethylene terephthalate, PET), and the layer 160B can be a woven or non-woven fabric. FIG. 12 is a schematic view illustrating another possible example in which the support sheet 120 has three material layers 160A, 160B and 160C bonded to one another, wherein the material layer 160A sandwiched between the two material layers 160B and 160C can be made of an opaque polyester material (e.g., PET), and each of the two material layers 160B and 160C can be a woven or non-woven fabric. The support sheet 120 having any of the layer structures shown FIGS. 11 and 12 can substantially block light passage.

Referring to FIGS. 1-9, each of the elongate strips 122 may have a single layer or a multilayer structure. For example, each elongate strip 122 may have a single layer, two layers, three layers, or more. The materials used for making the elongate strips 122 may be selected in accordance with desired properties for the elongate strips 122, such as a desired light transmittance, outer appearance, mechanical properties, etc. Examples of suitable materials for the elongate strips 122 can include, without limitation, opaque materials, semi-transparent materials such as woven or non-woven fabrics, and mesh fabrics.

Figure 13:
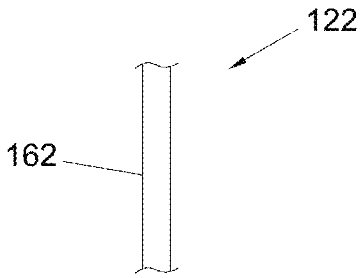
FIGS. 13-15 are schematic views illustrating various layer structures of an elongate strip used in the panel assembly.

FIG. 13 is a schematic view illustrating an example in which the elongate strip 122 has a single layer 162, which may be made of a woven or a non-woven fabric. The single layer structure of FIG. 13 may be exemplarily adapted to make elongate strips 122 that are semi-transparent.

Figure 14:
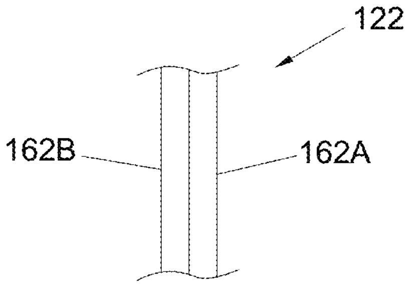
Figure 15:
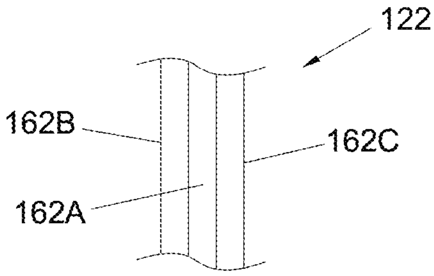

FIG. 14 is a schematic view illustrating an example in which the elongate strip 122 has two material layers 162A and 162B bonded to each other, wherein the material layer 162A can be made of a transparent or opaque polyester material (e.g., PET), and the material layer 162B can be a woven or a non-woven fabric. FIG. 15 is a schematic view illustrating another possible example in which the elongate strip 122 has three material layers 162A, 162B and 162C bonded to one another, wherein the material layer 162A sandwiched between the two material layers 162B and 162C can be made of a transparent or opaque polyester material (e.g., PET), and each of the two material layers 162B and 162C can be a woven or non-woven fabric. In the layer structures of FIGS. 14 and 15, the material layer 162A can add some stiffness so that the cell 124 formed from the elongate strip 122 can retain a desirable curved shape in use.

Any of the material layer structures of the support sheet 120 shown in FIGS. 10-12 can be combined with any of the layer structures of the elongate strips 122 shown in FIGS. 13-15 to form the panel assembly 104. FIG. 5 illustrates an example in which the support sheet 120 has a single layer, and each of the elongate strips 122A and 122B has a multilayer structure. FIG. 8 illustrates an example in which the support sheet 120 has a multilayer structure, and each of the elongate strips 122A and 122B also has a multilayer structure. FIG. 9 illustrates an example in which the support sheet 120 has a single layer, and each of the elongate strips 122A and 122B also has a single layer. FIGS. 10-12 illustrate examples in which the support sheet 120 can have a single layer or a multilayer structure, and each of the elongate strips 122A and 122B has a single layer. It will be appreciated that these examples are not limiting, and the support sheet 120 and the elongate strips 122 may be configured to have any suitable layer structures according to the needs.

Figure 16:
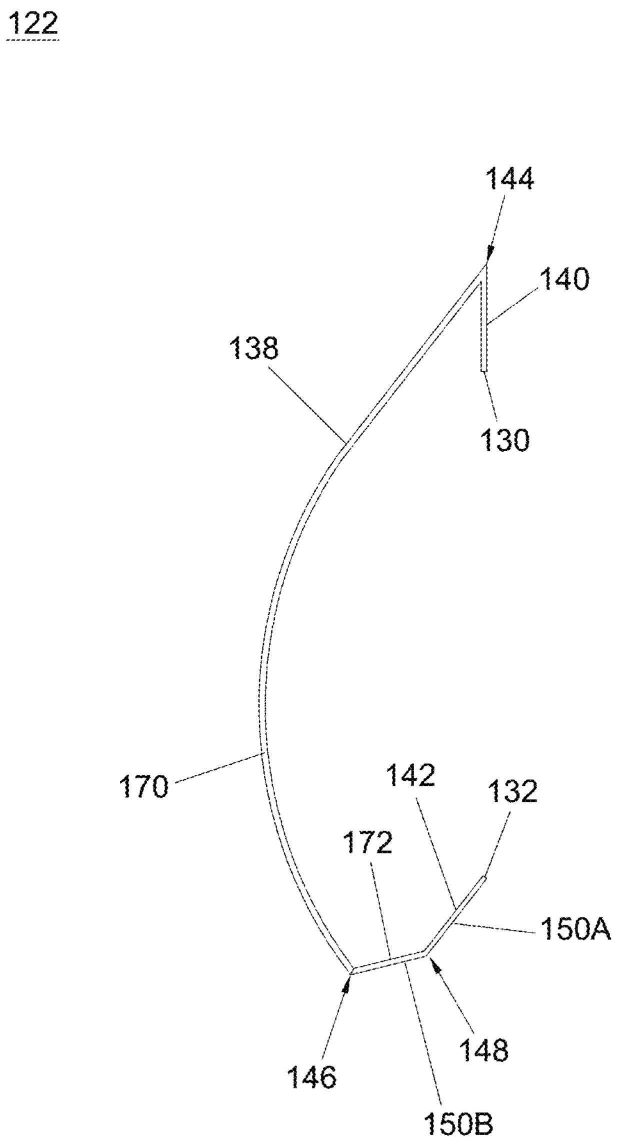
FIGS. 16-18 are schematic views illustrating various examples of an elongate strip having different layer structures in a main strip portion and a margin thereof.
Figure 17:
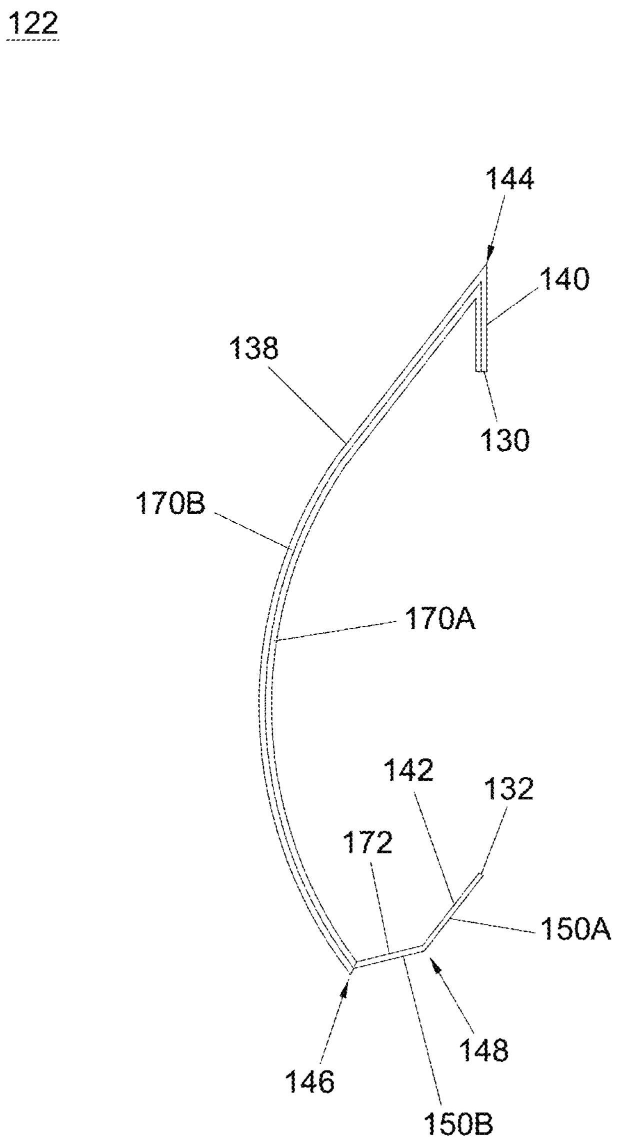
Figure 18:
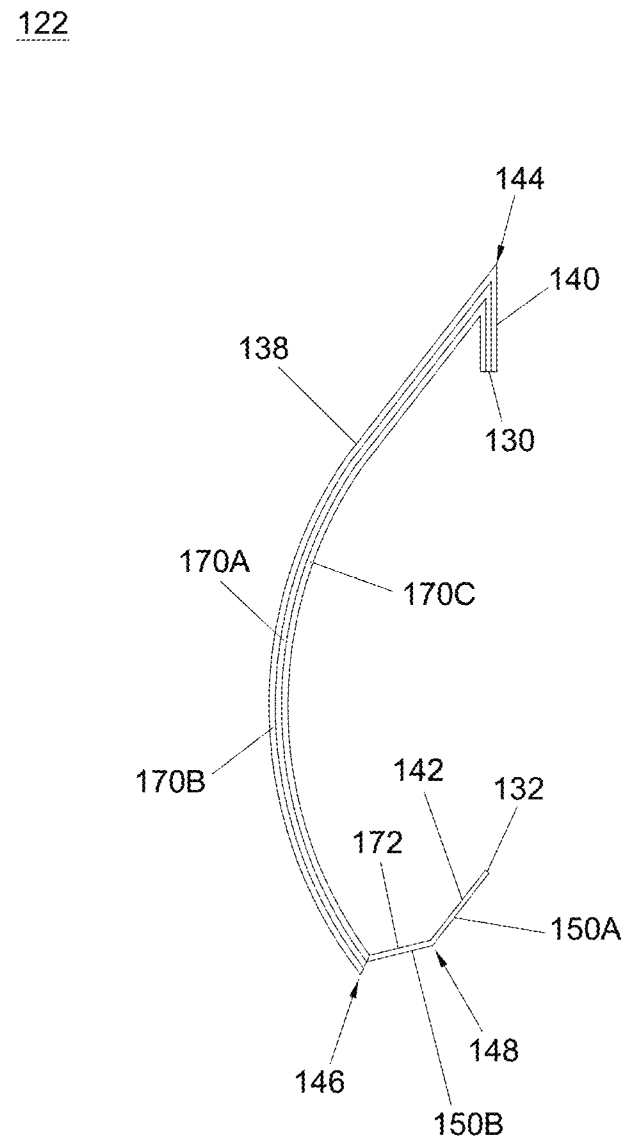
Figure 19:
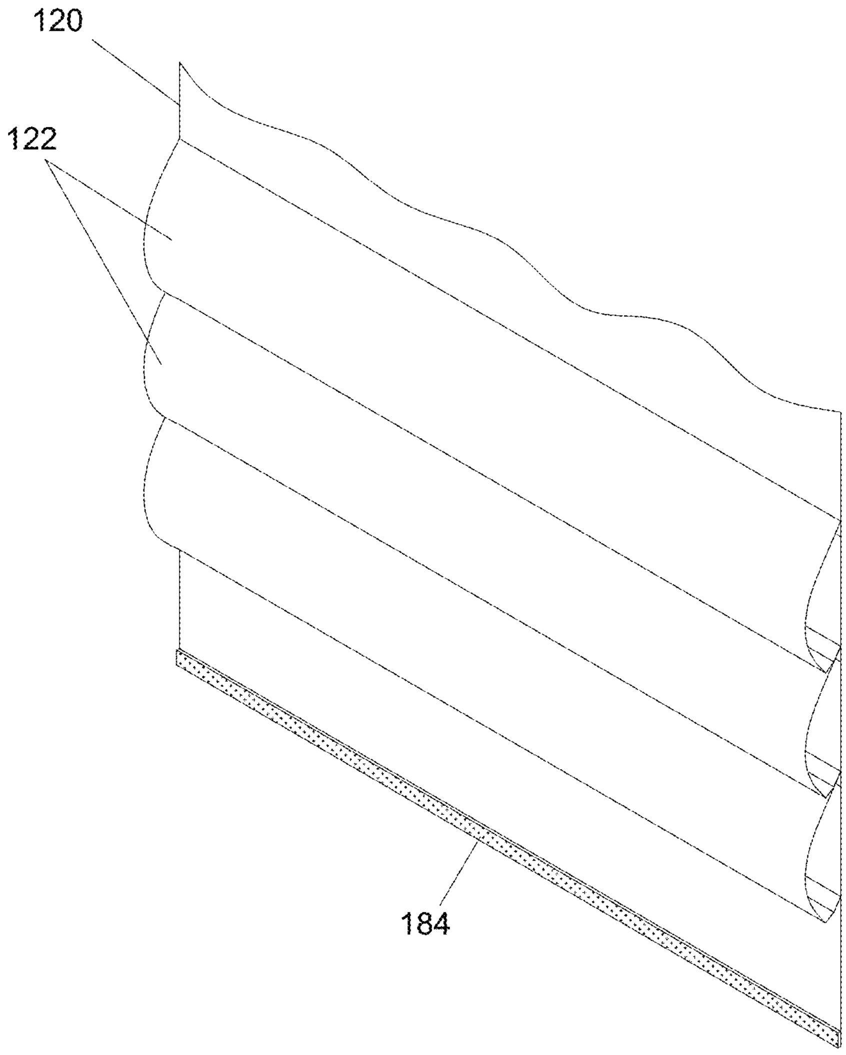
FIG. 19 is a perspective view illustrating some construction details provided at a bottom end of the panel assembly.
Figure 20:
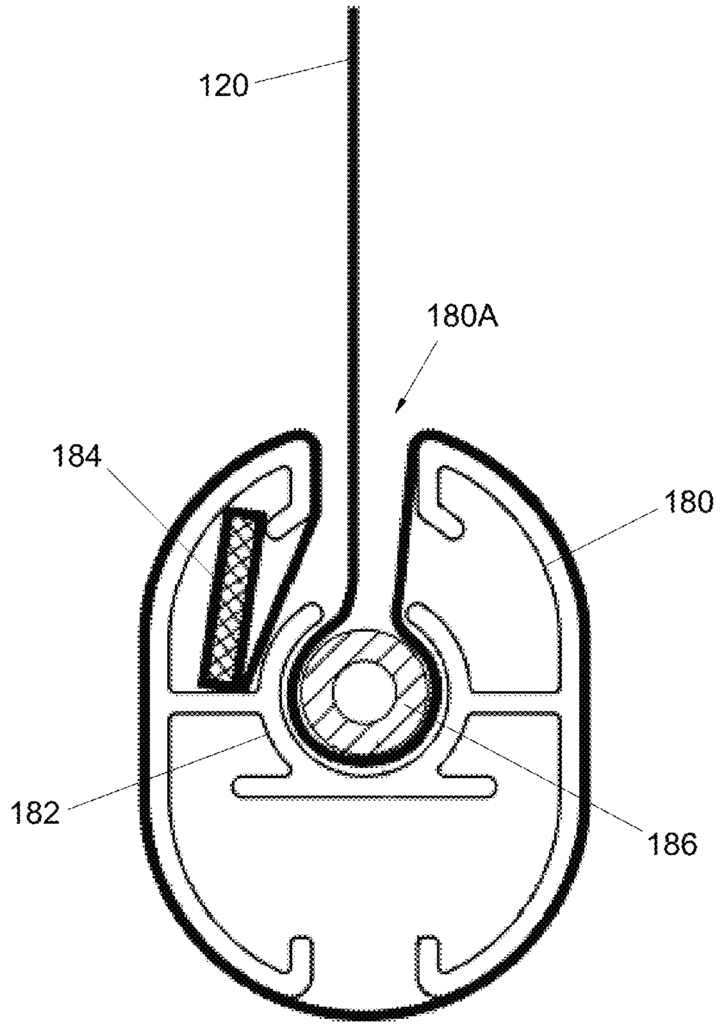
FIG. 20 is a partial cross-sectional view illustrating the connection of a rail at the bottom end of the panel assembly.

In some applications, it may be desirable that each of the elongate strips 122 has optical and/or mechanical properties in the margin 140 and/or 142 that differ from optical and/or mechanical properties in the main strip portion 138. For example, each of the elongate strips 122 may be configured to have different light transmittance in the main strip portion 138 and the margin 142, and/or different stiffness in the main strip portion 138 and the margin 142. FIGS. 16-18 are schematic views illustrating various examples in which the elongate strip 122 is configured to have a light transmittance that is lower in the main strip portion 138 than in the margin 142, wherein the main strip portion 138 includes at least an opaque or darkened material layer, and the margin 142 has a single layer made of a semi-transparent fabric (e.g., woven or non-woven fabric) or a mesh fabric.

In the example of FIG. 16, the main strip portion 138 and the margin 140 of the elongate strip 122 have a single layer 170 made of an opaque or darkened material (e.g., made of a polyester material such as PET), and the margin 142 has a single layer 172 that is connected with the layer 170 and is made of a semi-transparent fabric (e.g., woven or non-woven fabric) or a mesh fabric.

In the example of FIG. 17, the main strip portion 138 and the margin 140 of the elongate strip 122 have two layers 170A and 170B bonded to each other, and the margin 142 has a single layer 172 that is connected with the multilayer structure of the main strip portion 138 (e.g., connected with the layer 170A thereof). The layer 170A can be an opaque or darkened material layer (e.g., made of a polyester material), and the layer 170B can be made of a semi-transparent fabric (e.g., woven or non-woven fabric) or a mesh fabric. The layer 172 is made of a semi-transparent fabric (e.g., woven or non-woven fabric) or a mesh fabric.

In the example of FIG. 18, the main strip portion 138 and the margin 140 of the elongate strip 122 have three layers 170A, 170B and 170C bonded to one another, and the margin 142 has a single layer 172 that is connected with the multilayer structure of the main strip portion 138 (e.g., connected with the layer 170C thereof). The layer 170A sandwiched between the two layers 170B and 170C can be an opaque or darkened material layer (e.g., made of a polyester material), and each of the two layers 170B and 170C can be made of a semi-transparent fabric (e.g., woven or non-woven fabric) or a mesh fabric. The layer 172 is made of a semi-transparent fabric (e.g., woven or non-woven fabric) or a mesh fabric.

A panel assembly 104 that includes elongate strips 122 having different light transmittance as described above can generally block light in the main strip portions 138 of the elongate strips 122 and allow localized light passage in regions corresponding to the margins 142 of the elongate strips 122. Moreover, providing different numbers of layers in the main strip portion 138 and the margin 142 can result in mechanical properties that are different in these regions of the elongate strip 122. For example, providing a number of layers that is greater in the main strip portion 138 than in the margin 142 of the elongate strip 122 can result in the main strip portion 138 being stiffer or more rigid than the margin 142, especially when the main strip portion 138 includes at least a layer made of a polyester material and the margin 142 is a single layer made of a woven or non-woven fabric or a mesh fabric. In this manner, the cell 124 formed from the elongate strip 122 can retain a desirable shape in use, whereas the margin 142 is more flexible than the main strip portion 138 and can facilitate collapse and expansion of the cell 124.

Referring to FIGS. 1-4, the panel assembly 104 can further include a rail 180 connected with the support sheet 120. The rail 180 extends along the width W of the support sheet 120, and serves as a weighing element that can assist in expanding and stabilizing the panel assembly 104 during use. In conjunction with FIGS. 1-4, FIGS. 19 and 20 are schematic views illustrating further construction details for attaching the rail 180 to the support sheet 120. Referring to FIGS. 1-4, 19 and 20, the rail 180 can have a hollow interior that is connected with an opening 180A, and a retaining structure 182 is provided inside the hollow interior of the rail 180. The support sheet 120 can have a bottom end attached to an anchor strip 184. For attaching the rail 180 to the support sheet 120, the anchor strip 184 is disposed inside the rail 180 with the support sheet 120 extending outside the rail 180 via the opening 180A. While the anchor strip 184 remains inside the rail 180, the support sheet 120 can wrap around the rail 180, and a restricting part 186 can be fitted with the retaining structure 182 so as to hold a portion of the support sheet 120 between the retaining structure 182 and the restraining part 186. For example, the retaining structure 182 can have a C-shaped portion, and the restraining part 186 can be a rod that can be positioned inside the C-shaped portion of the retaining structure 182. The support sheet 120 can be thereby attached to the rail 180, which can move upward and downward during adjustment of the panel assembly 104.

Advantages of the structures described herein include the ability to provide a panel assembly that is relatively simple in construction, including a support sheet and multiple elongate strips bonded to the support sheet for forming multiple cells. Each of the elongate strips can have a single layer or a multilayer structure, and multiple perforations lines or creases for facilitating the collapse and expansion of the cells. The construction of the panel assembly described herein can be easily adapted according to the needs, and can be manufactured in a cost-effective manner.

Realizations of the structures have been described only in the context of particular embodiments. These embodiments are meant to be illustrative and not limiting. Many variations, modifications, additions, and improvements are possible. These and other variations, modifications, additions, and improvements may fall within the scope of the claims that follow.

What is claimed is:

1. A panel assembly for a window shade, comprising:

a support sheet; and a plurality of elongate strips bonded to the support sheet, the support sheet and the elongate strips forming a plurality of cells, the elongate strips including at least a first and a second elongate strip adjacent to each other, wherein each of the first and second elongate strip has a first and a second edge opposite to each other, and a main strip portion located between a first and a second margin, the first margin adjoining the main strip portion along a first folding line and extending between the first folding line and the first edge, the second margin adjoining the main strip portion along a second folding line and extending between the second folding line and the second edge, the second margin including a third folding line substantially parallel to the second folding line;

wherein the first margin of each of the first and second elongate strip is bonded to the support sheet, and the second margin of the first elongate strip is bonded to the second elongate strip at a first margin portion between the third folding line and the second edge of the first elongate strip and unbonded to the second elongate strip at a second margin portion between the second folding line and the third folding line of the first elongate strip, the second edge of the first elongate strip being flush against the first folding line of the second elongate strip.

2. The panel assembly according to claim 1, wherein each of the first and second elongate strip has a first and a second strip surface opposite to each other that extend from the first edge to the second edge and stretch across the main strip portion and the first and second margins, the first margin of each of the first and second elongate strip being bonded on the first strip surface or the second strip surface to the support sheet.

3. The panel assembly according to claim 2, wherein the first margin of each of the first and second elongate strip is bonded on the first strip surface to the support sheet, and the first margin portion of the second margin of the first elongate strip is bonded on the first strip surface to the second elongate strip.

4. The panel assembly according to claim 3, wherein the first margin portion of the second margin of the first elongate strip is bonded to the main strip portion of the second elongate strip with the second edge of the first elongate strip positioned adjacent to the support sheet.

5. The panel assembly according to claim 2, wherein the first margin of each of the first and second elongate strip is bonded on the second strip surface to the support sheet, and the first margin portion of the second margin of the first elongate strip is bonded on the first strip surface to the second elongate strip.

6. The panel assembly according to claim 5, wherein the first margin portion of the second margin of the first elongate strip is bonded to the main strip portion of the second elongate strip with the second edge of the first elongate strip positioned adjacent to the first folding line of the second elongate strip.

7. The panel assembly according to claim 1, wherein the support sheet has a multilayer structure including at least one layer made of an opaque material.

8. The panel assembly according to claim 7, wherein the multilayer structure of the support sheet includes a fabric layer made of a woven or non-woven fabric that is bonded to the layer of the opaque material.

9. The panel assembly according to claim 1, wherein the support sheet has a multilayer structure including at least one layer made of an opaque material, and each of the first and second elongate strip is made of a single layer of a woven or non-woven fabric.

10. The panel assembly according to claim 9, wherein the multilayer structure of the support sheet includes a fabric layer made of a woven or non-woven fabric that is bonded to the layer of the opaque material, and each of the first and second elongate strip is bonded to the fabric layer of the support sheet.

11. The panel assembly according to claim 1, wherein the support sheet includes at least one layer made of polyester.

12. The panel assembly according to claim 1, wherein each of the first, second and third folding line is formed by a perforation line or a crease.

13. A window shade comprising:

a head frame having a roller; and a panel assembly according to claim 1, wherein the panel assembly is connected with the roller, the roller being rotatable to wind and unwind the panel assembly.

14. The panel assembly according to claim 1, wherein the support sheet is bonded to the first margin of the second elongate strip along the first folding line thereof so that the second edge of the first elongate strip and the first folding line of the second elongate strip are prevented from moving away from the support sheet as the cells transition between a collapsed state and an expanded state.

15. A panel assembly for a window shade, comprising:

a support sheet; and a plurality of elongate strips bonded to the support sheet, the support sheet and the elongate strips forming a plurality of cells, the elongate strips including at least a first and a second elongate strip adjacent to each other, wherein each of the first and second elongate strip has a first and a second edge opposite to each other, and a main strip portion located between a first and a second margin, the first margin adjoining the main strip portion along a first folding line and extending between the first folding line and the first edge, the second margin adjoining the main strip portion along a second folding line and extending between the second folding line and the second edge, the second margin including a third folding line substantially parallel to the second folding line;

wherein the first margin of each of the first and second elongate strip is bonded to the support sheet, and the second margin of the first elongate strip is bonded to the second elongate strip at a first margin portion between the third folding line and the second edge of the first elongate strip and unbonded to the second elongate strip at a second margin portion between the second folding line and the third folding line of the first elongate strip, the first elongate strip and the support sheet defining entirely one cell.

16. The panel assembly according to claim 15, wherein each of the first and second elongate strip is made of a single layer of a woven or non-woven fabric.

17. The panel assembly according to claim 15, wherein the support sheet has a multilayer structure including at least one layer made of an opaque material, and each of the first and second elongate strip is made of a single layer of a woven or non-woven fabric.

18. The panel assembly according to claim 17, wherein the multilayer structure of the support sheet includes a fabric layer made of a woven or non-woven fabric that is bonded to the layer of the opaque material, and each of the first and second elongate strip is bonded to the fabric layer of the support sheet.

19. The panel assembly according to claim 15, wherein the support sheet includes at least one layer made of polyester.

20. A window shade comprising:

a head frame having a roller; and a panel assembly according to claim 15, wherein the panel assembly is connected with the roller, the roller being rotatable to wind and unwind the panel assembly.

* * * * *